US006659438B2

(12) United States Patent
Michael et al.

(10) Patent No.: US 6,659,438 B2
(45) Date of Patent: Dec. 9, 2003

(54) MOUNT WITH DUAL STIFFNESS

(75) Inventors: Robert J. Michael, Erie, PA (US); Peter D. Howorth, Fairview, PA (US); Atle Larsen, Erie, PA (US); Troy P. Herbst, Erie, PA (US); Ulrich A. Kuester, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/090,204

(22) Filed: Mar. 4, 2002

(65) Prior Publication Data

US 2003/0164586 A1 Sep. 4, 2003

(51) Int. Cl.[7] .............................. B60G 11/22; F16F 1/40
(52) U.S. Cl. ......................... 267/294; 267/6; 267/269; 267/153
(58) Field of Search ................... 267/140.11, 140.13, 267/141.1, 140.4, 141.4, 141.7, 153, 269, 294, 6

(56) References Cited

U.S. PATENT DOCUMENTS

| | | | | | |
|---|---|---|---|---|---|
| 2,463,366 A | * | 3/1949 | Evans | ........................... | 213/45 |
| 2,535,197 A | * | 12/1950 | Dath | ........................... | 213/45 |
| 2,559,743 A | * | 7/1951 | Williams | ........................ | 213/45 |
| 2,686,667 A | * | 8/1954 | Willison et al. | ............. | 267/153 |
| 2,801,010 A | * | 7/1957 | Willison | ........................ | 213/45 |
| 2,880,885 A | * | 4/1959 | Willison | ........................ | 213/45 |
| 3,134,585 A | * | 5/1964 | Trask | ........................... | 267/153 |
| 3,339,911 A | | 9/1967 | Strom | ........................... | 267/69 |
| 3,409,284 A | | 11/1968 | Rix | ................................. | 267/1 |
| 3,467,353 A | * | 9/1969 | Peterson et al. | ........... | 267/141.1 |
| 3,539,170 A | | 11/1970 | Hamel | | |
| 3,731,913 A | * | 5/1973 | Hirst | ............................ | 267/294 |
| 3,797,851 A | * | 3/1974 | Hirst | ............................ | 267/294 |
| 4,025,063 A | * | 5/1977 | Willison | ........................ | 267/153 |
| 4,111,406 A | * | 9/1978 | Zanow | .......................... | 267/153 |
| 4,566,678 A | * | 1/1986 | Anderson | ................... | 267/141.1 |
| 4,750,720 A | | 6/1988 | Wolf et al. | .................. | 267/219 |
| 4,781,365 A | * | 11/1988 | Harrison | ...................... | 267/294 |
| 4,861,007 A | * | 8/1989 | Morini | ......................... | 267/153 |
| 4,925,163 A | | 5/1990 | Wolf et al. | .................. | 267/153 |
| 4,936,539 A | | 6/1990 | Nangle | ......................... | 248/633 |
| 4,958,812 A | | 9/1990 | Wolf et al. | .................. | 267/294 |
| 4,962,916 A | | 10/1990 | Palinkas | ........................ | 267/153 |
| 5,014,967 A | | 5/1991 | Wolf et al. | .................. | 267/153 |
| 5,052,652 A | | 10/1991 | Sevilleja et al. | ............ | 284/634 |
| 5,092,738 A | | 3/1992 | Byrnes et al. | ........... | 416/134 A |
| 5,108,077 A | | 4/1992 | Spaltofski | .................... | 267/153 |
| 5,246,214 A | | 9/1993 | Wolf et al. | .................. | 267/153 |
| 5,413,320 A | | 5/1995 | Herbst | .................... | 267/140.13 |
| 5,489,087 A | | 2/1996 | Bitschkus | ................... | 267/141 |
| 5,540,549 A | | 7/1996 | McGuire | ...................... | 416/140 |
| 5,692,728 A | | 12/1997 | Shiozawa | ..................... | 248/618 |
| 5,762,295 A | | 6/1998 | McGuire et al. | .............. | 244/54 |
| 6,045,328 A | | 4/2000 | Jones | .......................... | 416/140 |
| 6,178,894 B1 | | 1/2001 | Leingang | | |

FOREIGN PATENT DOCUMENTS

GB          2 352 016 A       1/2001

* cited by examiner

Primary Examiner—Christopher P. Schwartz
Assistant Examiner—Devon Kramer
(74) Attorney, Agent, or Firm—Edward F. Murphy, III (57) ABSTRACT

A mount with a first attachment member; a second attachment member spaced from the first attachment member; and resilient members joining the first and second attachment members, each of the resilient members having at least one void, the voids being collapsible under loading between a first open void condition where the mount has a first substantially constant stiffness, and a second collapsed condition where the voids are substantially closed, the mount having a second substantially constant stiffness when the voids are in the second collapsed condition.

8 Claims, 6 Drawing Sheets

MOUNT WITH DUAL STIFFNESS

FIELD OF THE INVENTION

The invention relates to a mount for supporting a frame and more specifically the invention relates to a mount having a resilient portion and at least one collapsible void provided in the resilient portion, the mount having a first substantially constant stiffness under loading that does not cause the at least one void to be closed and a second substantially constant stiffness under loading which substantially closes the at least one void.

BACKGROUND OF THE INVENTION

Vehicles, such as trucks which haul cargo have a trailer portion that is supported by a frame. The frame, in turn, is supported in part by a number of spring members such as leaf springs where each spring member extends between longitudinally adjacent ends of parallel wheel axle with the ends of each leaf spring being made integral with the axle ends.

In order to control the vehicle's vibrational dynamics a bearing or mount is supported on the leaf spring and is connected to the vehicle frame and the spring. The axles are isolated from the frame through the mounts. Transmission of the disturbances from the wheels to the frame is limited by the mounts.

It is most desirable to the vehicle driver to have vehicle mounts that are relatively soft when supported load is at a minimum and are relatively stiff when the supported load is at a maximum. Such a mount would provide the greatest comfort to the vehicle driver and would also improve load stability. Most frequently, prior art mounts for vehicle suspensions have a single stage stiffness that provides the same, single stiffness to the vehicle suspension regardless of the load being supported by the vehicle frame. Such prior art mounts are designed to support large vehicle loads.

Because prior art mounts comprise a single spring rate, the natural frequency of the system varies undesirably as the load supported by the frame is increased and decreased. It is well known to those skilled in the relevant art that the natural frequency of any vibratory system, $\omega$ is equal to the square root of the stiffness of the system spring, k divided by the mass of the system, m. In equation form this relationship may be set forth as $\omega = \sqrt{k/m}$ where the natural frequency is expressed in cycles per second. Applying this relationship of spring stiffness and mass to current vehicle suspension systems, when the spring rate is constant, the natural frequency of the system decreases as the loading increases, and the natural frequency increases as the magnitude of the load decreases. However, because the single spring rate of prior art mounts is designed to support a loaded frame, the stiffness of the prior art mounts of vehicle support systems is much greater than desired between the minimum and maximum loading conditions.

As indicated hereinabove, in the most desirable vehicle support systems the vehicle suspension is relatively soft when the frame is unloaded and the system stiffness increases as the vehicle is loaded. However such suspension systems with a variable stiffness comprise complicated, expensive devices with a large number of component parts. One type of variable stiffness device for a vehicle suspension comprises multiple mounts arranged in a series relationship. In such devices, the first of the serially arranged mounts is actuated during a first loading range and then the other mounts are actuated as the magnitude of the loading increases and the limits of the actuating loads are exceeded. As the loading increases the first spring element bottoms out, activating the second element of the series, and in combination the elements provide an increased spring rate. In other mounts that provide variable stiffness, the stiffness is modified pneumatically.

Prior art spring or damping elements comprise resilient portions that include one or more cores or voids in order to significantly reduce the stiffness of the spring element in the cored directions. Such spring elements are used to control the motion of the supported device which may be a vehicle engine for example. As the supported device is displaced, the magnitude and direction of such displacement may cause the voids in such prior art spring elements to partially or fully close thereby increasing the stiffness of the spring to limit further displacement of the supported device. A forced displacement of the device may be of such significant magnitude and direction that the voids are closed by the displacement. By closing the voids the displacement of the device reaches its maximum and the displacement is abruptly stopped or "snubbed" by the spring element. The stiffness is changed in a non-linear manner, and such changes in stiffness are temporary. Thus in response to a forced displacement such spring elements temporarily and variably increase spring stiffness to limit displacement of a device, and the stored energy in the spring element returns the supported device to the desired location. The prior art spring elements do not provide a first substantially constant stiffness during a first loading range and a second substantially constant stiffness during a second loading range. Additionally, in such prior art spring elements any changes in the stiffness of the spring element are temporary as such devices serve to limit displacement rather than to support static loads.

In summary, such attempts at providing a mount for a vehicle suspension that has an adjustable or dual rate stiffness have resulted in mounts with designs that are complex, expensive and comprise a large number of component parts. Mounts that provide a single constant stiffness are too stiff when the vehicle is unloaded. Other springs serve to variably change spring stiffness in order to limit displacement rather than support static loads.

The foregoing illustrates limitations known to exist in present mounts and vehicle suspension systems. Thus, it is apparent that it would be advantageous to provide an alternative mount suitable for use in a vehicle suspension system where the mount has greater than one constant stiffness and comprises a relatively uncomplicated design. Accordingly, a suitable alternative mount is provided including features more fully disclosed hereinafter.

SUMMARY OF THE INVENTION

In one aspect of the present invention this is accomplished by providing a mount comprising a first attachment member a second attachment member spaced from the first attachment member; and at least one resilient member joining the first and second attachment members, each of the at least one resilient members including at least one void, said at least one void being collapsible under loading between a first open void condition where the mount has a first substantially constant stiffness, and a second collapsed condition where each of the voids is substantially closed, the mount having a second substantially constant stiffness when the at least one void is in the second condition.

The mount of the present invention provides a first substantially linear stiffness when the load supported by the frame is of a magnitude between a minimum load value and a predetermined Transition Load. The mount of the present invention provides a second substantially linear stiffness when the load supported by the frame is of a magnitude between the predetermined Transition Load and a maximum load condition. The first and second stiffness values are substantially constant. The second substantially constant stiffness supplied by the mount is significantly greater than the first substantially constant stiffness. When the load supported by the frame is increased to a magnitude at or above the Transition Load, the mount stiffness is abruptly increased to the second substantially constant stiffness and when the load is reduced in magnitude to a magnitude below the Transition Load, the stiffness is abruptly reduced from the second mount stiffness to the first mount stiffness.

The mount of the present invention may comprise a plurality of resilient layers with stiffening members or shims separating each adjacent resilient layer. The shims promote the significant increase in mount stiffness when the mount of the present invention experiences loads at or above the predetermined Transition Loads. When the cores or voids are substantially closed by the Transition loading, the axial thickness of the resilient layer is minimized resulting in a small axial separation between adjacent shims. As a result, the mount produces a significant, abrupt increase in mount stiffness at or above the Transition Load value. Prior art mounts with cores or voids provided in the resilient layer do not include stiffening shims in mount and as a result do not produce the abrupt, significant changes in stiffness that are produced by the mount of the present invention.

Each resilient layer includes at least one void. In one preferred embodiment of the invention each resilient layer includes three voids. They voids of each layer may be aligned in the axial direction and may comprise any suitable cross section. For example, the voids may have a dog-bone shape where the end portions have a greater axial dimension than the portion between the ends, an elliptical shape or a circular shape. The preferred shape for the voids or cores includes end portions that extend outwardly axially a greater distance than the portion between the ends. In this way, as the mount collapses and the cores are closed, stress concentrations in the voids are reduced.

The axial thickness of the resilient layers are varied and the sizes of the voids provided in the resilient layers are varied so that as a load equal to or greater than the Transition Load is applied to the mount, the mount abruptly collapses and assumes an increased stiffness. For example, in the mount of the present invention, the resilient layer made integral with the first attachment member has the maximum layer axial dimension and the layer made integral with the second attachment layer has the minimum layer axial dimension. Additionally, the voids provided in the resilient layer with the maximum axial dimension also have a maximum void area, and the voids provided in the resilient layer with the minimum axial dimension have a minimum void area.

The foregoing and other aspects will become apparent from the following detailed description of the invention when considered in conjunction with the accompanying drawing figures.

DETAILED DESCRIPTION OF THE PREFERRED EMBODIMENTS

Figure 1:
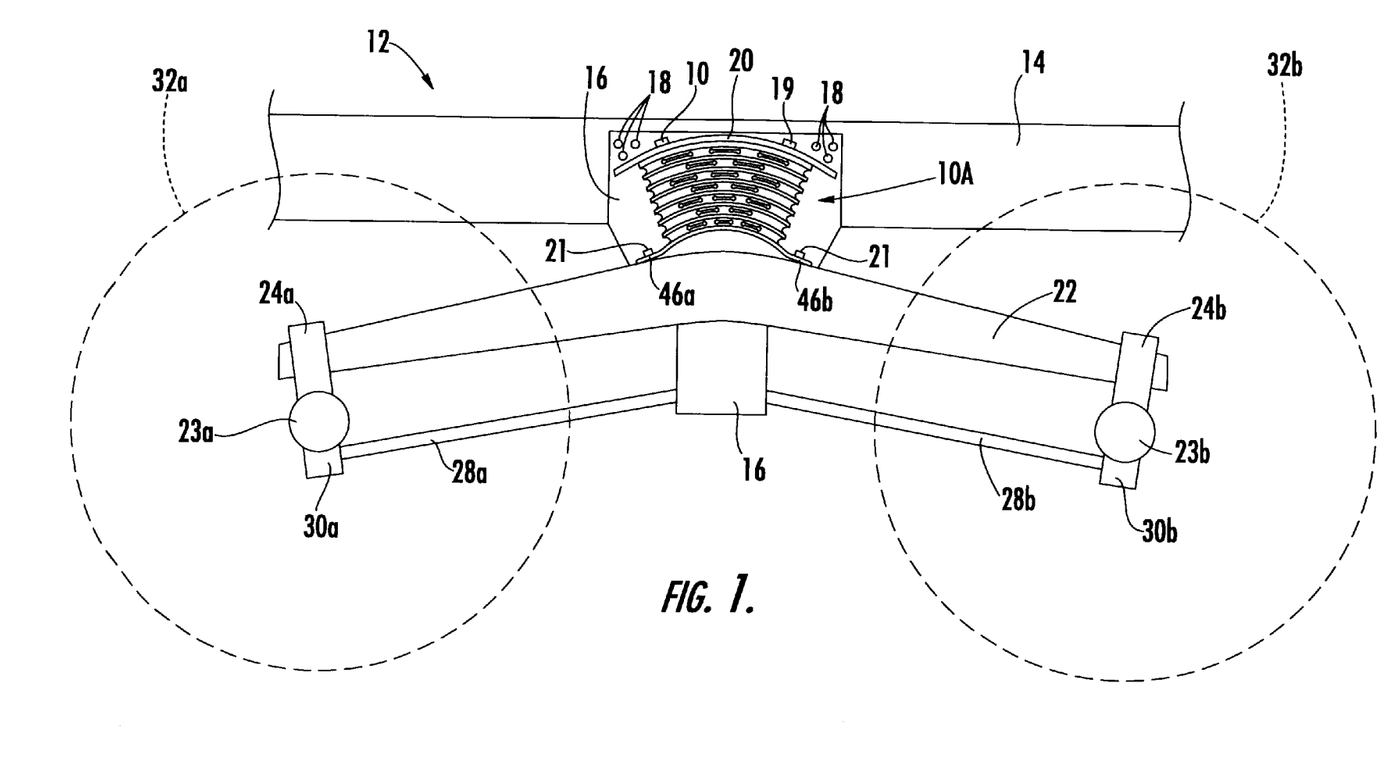
FIG. 1 is a schematic representation of a portion of a type of vehicle suspension that includes the mount of the present invention with at least two substantially constant stiffness values.

Now turning to the drawing Figures wherein like parts are referred to by the same numbers in the several views, FIG. 1 illustrates first embodiment mount 10A of the present invention as it is mounted for use in combination with a conventional vehicle frame 12 which is partially, schematically represented in FIG. 1. The vehicle frame may be a class 8 truck frame for example. Although only a portion of conventional frame 12 is disclosed, the co-inventors submit that the frame 12 is a conventional frame well known to one skilled in the relevant art and as such is shown and described in detail sufficient for somebody skilled in the relevant art to understand the structure and functionality of the mount of the present invention.

Frame 12 generally comprises at least one rigid, elongate longitudinally extending rail member 14 the length of which is partially illustrated in FIG. 1. A second rail member (not shown) extends longitudinally parallel to rail 14 illustrated in FIG. 1. A mount support bracket 16 is fixed to the frame member 14 in a conventional manner such as by a plurality of bolt connections 18. The support bracket 16 includes an arcuate attachment flange 20 that extends outwardly substantially perpendicular to the frame rail 14 when the support bracket 16 is fixed to the rail 14 in the conventional manner described hereinabove. The ends of conventional tension rods 28a, 28b are made integral between the bracket 16 and an end of the leaf spring and the rod ends are supported by a conventional suitable bearing member 30a, 30b and each bearing is in turn made integral with an axle 23a, 23b. See FIG. 1.

Mount 10A of the present invention is attached by a conventional fastener means to both the underside of attachment flange 20 and along the top of conventional leaf spring 22. The conventional fastener means may comprise bolts or the like. The leaf spring ends are supported by conventional, suitable bearing means 24a, 24b and each bearing means 24a, 24b is made integral with the axle member along the side of the axle opposite the bearing members 30a, 30b. Conventional wheel members 32a, 32b are conventionally, rotatably mounted on axles 23a, 23b. During displacement of the vehicle, disturbances applied to the wheels are transmitted to the axles 23a, 23b and leaf spring 22. Mount 10A serves to limit the transmission of vibratory disturbances from the leaf spring 22 to the frame 14 and supported load on the frame. In this way the mount of the present invention limits the negative effects of such vibratory forces on the frame, load supported by the frame or vehicle driver.

Figure 2:
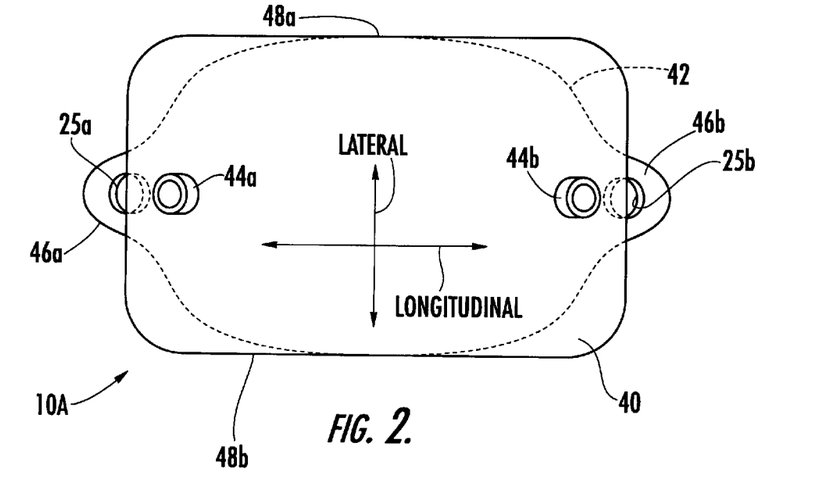
FIG. 2 is a top plan view of the mount of FIG. 1.
Figure 3:
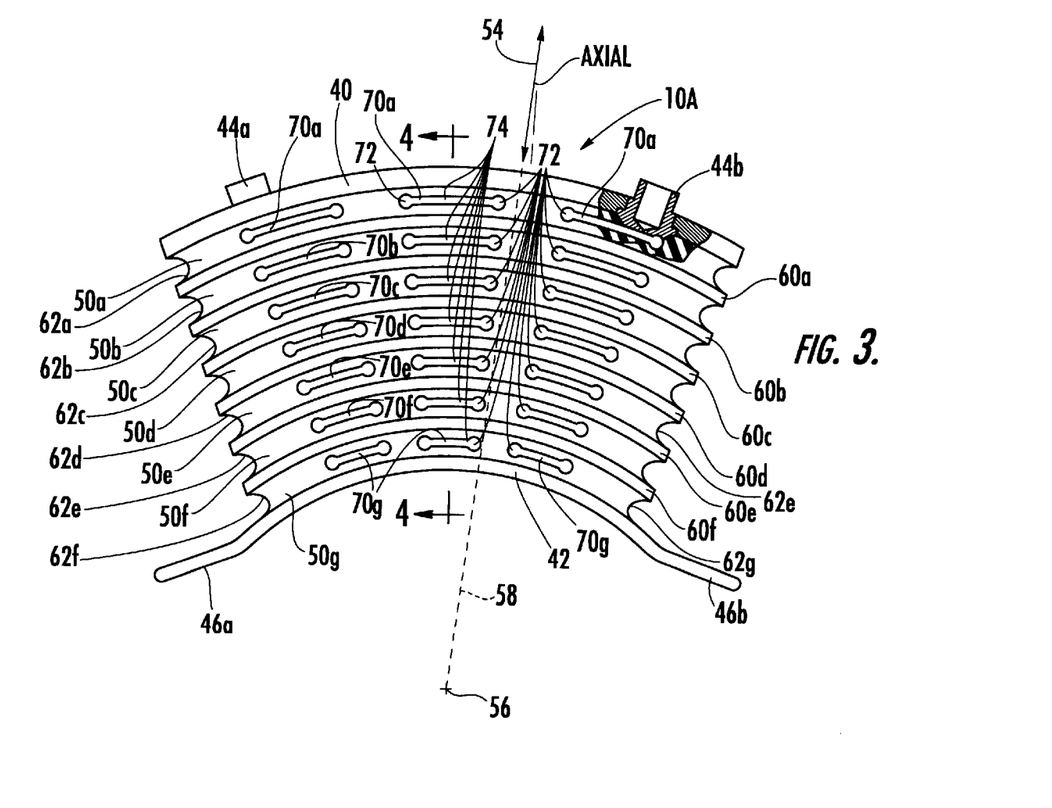
FIG. 3 is an enlarged front view of the first embodiment mount of FIG. 1 with the mount removed from the vehicle frame.
Figure 4:
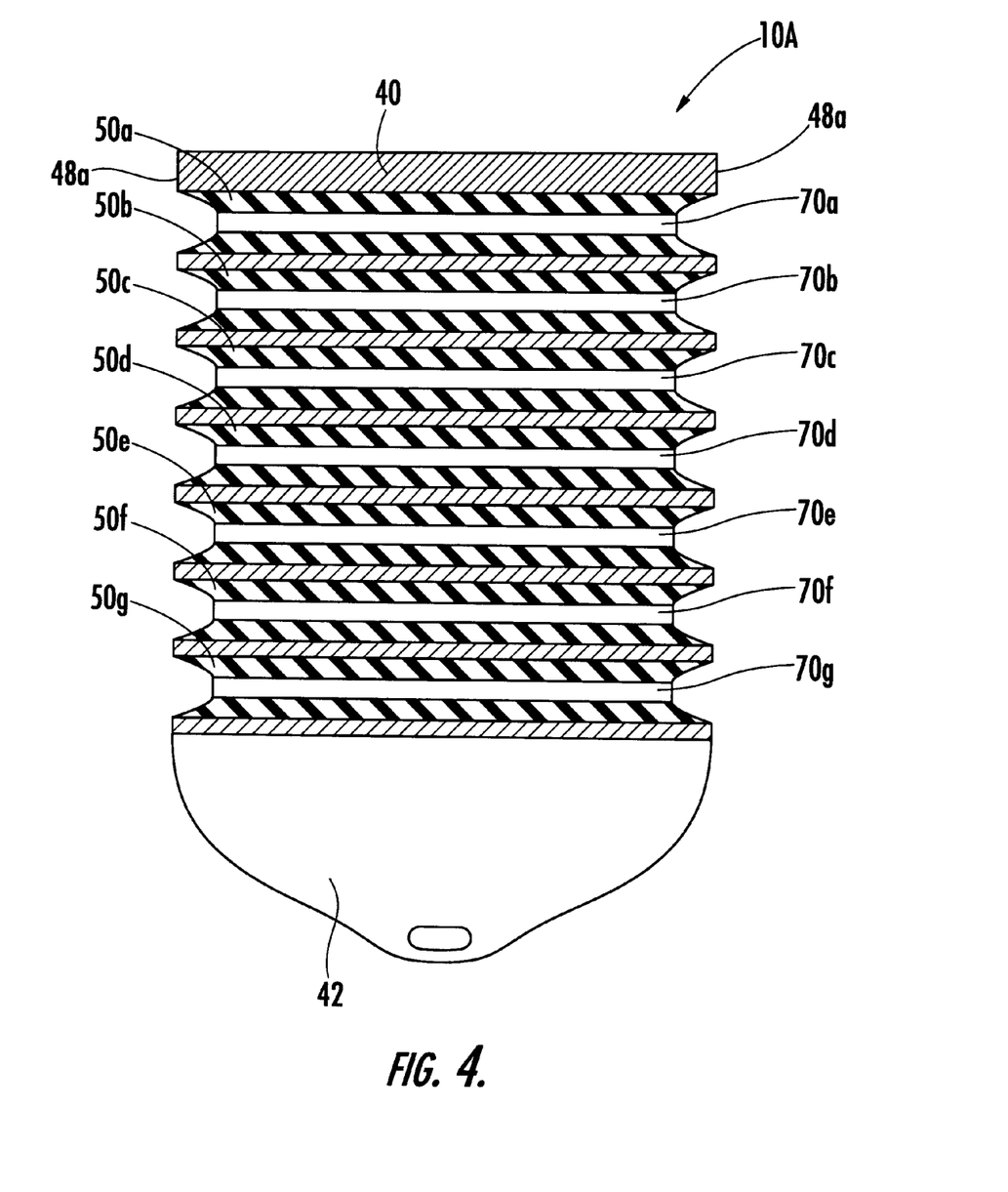
FIG. 4 is a sectional view taken along line 4—4 of FIG. 3.

Turning now to FIGS. 2–4 which illustrate the first embodiment mount design 10A of the present invention in greater detail, mount 10A comprises a first arcuate attachment member 40, a second arcuate attachment member 42 in spaced relation with the first attachment member, and at least one resilient member joining the first and second attachment members. FIG. 2 illustrates a top view of first embodiment mount 10A. As the description proceeds the lateral and longitudinal directions and orientations will be referred to in describing the mount of the present invention. For the purpose of clarity the general lateral and longitudinal directions are identified according to the axes illustrated in FIG. 2 and are marked respectively as LATERAL and LONGITUDINAL. The first attachment member 40 includes connection members 44a, 44b that are threadably or otherwise conventionally made integral with the first attachment member 40 which may be made out of any suitable relatively rigid material, such as a metal for example. The connection members are essentially hollow plugs that are adapted to receive the ends of conventional fasteners 19 that are passed through attachment flange 20 to attach the mount first attachment member and attachment flange. FIG. 3 includes a broken away portion that further illustrates the interconnection between connection members 44 and first attachment member 40 in greater detail. Second attachment member 42 includes a pair of longitudinally extending attachment flange members 46a, 46b that are seated on the body of leaf spring 22 as shown in FIG. 1. Conventional fasteners 21 are passed through openings 25a, 25b provided in the flange members 46a, 46b and holes (not shown) in the leaf spring and in this way serve to make the spring 22 and member 42 integral. As shown in FIG. 2 the first and second attachment members 40 and 42 comprise lateral ends 48a and 48b.

As shown in FIG. 3, the mount 10A of the first embodiment of the present invention the at least one resilient layer comprises a plurality of resilient layers identified as 50a, 50b, 50c, 50d, 50e, 50f, and 50g with elements 50a and 50g made integral in a conventional manner with first and second attachment members 40 and 42 respectively. The resilient layers 50a–50g are made from a suitable resilient material such as an elastomer for example. Although seven resilient layers are illustrated, it should be understood that any suitable number of layers may be provided in the mount of the present invention. The resilient layers 50a and 50g are made integral with the first and second attachment means using a conventional adhesive for bonding rubber and metal components such as Chemlok® Adhesive sold by Lord Corporation or Erie, Pa. Each resilient layer is separated from the next adjacent resilient layer by a metal stiffening member 60a, 60b, 60c, 60d, 60e, and 60f and each stiffening layer or shim is bonded to a respective pair of adjacent resilient layers using the conventional adhesive as previously described. More specifically, as illustrated in FIG. 3, stiffening member 60a separates resilient layers 50a, 50b; stiffening member 60b separates resilient layers 50b, 50c; stiffening member 60c separates resilient layers 50c, 50d; stiffening member 60d separates resilient layers 50d, 50e; stiffening member 60e separates resilient layers 50e, 50f; and stiffening member 60f separates resilient layers 50f, 50g. As the description proceeds the members 60a–60f may be referred to as stiffening members or shims.

Although the attachment members 40, 42, resilient layers 50a–50g and shim members 60a–60f are shown as having arcuate configurations, it should be understood that such components of mount 10A and the other preferred embodiments of the mount of the present invention may alternatively be substantially planar. Turning to FIG. 3, as the description proceeds, the distance separating the attachment members 40 and 42, resilient layers and shims in the direction of axis 54 shall be referred to as either the AXIAL or radial direction. For purposes of describing the preferred embodiments of the mount of the present invention, as shown in FIG. 3, the axis 54 is coaxially oriented with the radius 58 extending from the projected center 56 of the arcuate members 40, 42, 50a–50g and 60a–60f.

Figure 5:
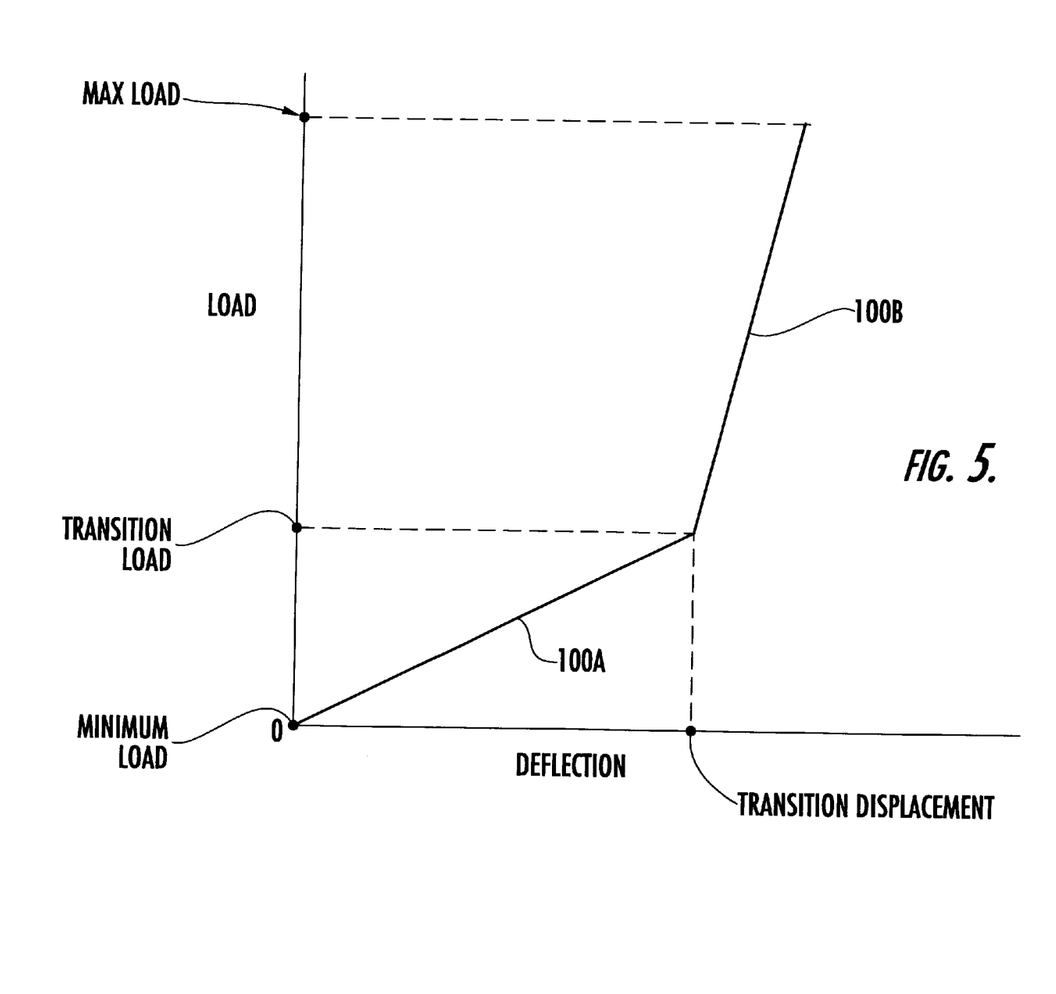
FIG. 5 is a plot of load versus deflection for the mount of the present invention and the plot generally illustrates a first substantially constant stiffness, and a second substantially constant stiffness where the stiffness values change at a predetermined Transition Load value.

The mount 10A of the present invention serves to support a vehicle suspension with a first substantially constant stiffness applied continuously when a first load, having a magnitude that is less than a predetermined Transition Load magnitude, is applied to the frame 12, and a second substantially constant stiffness applied continuously when a second load, having a magnitude that is equal to or greater than the predetermined Transition Load is applied to the frame 12. FIG. 5 generally illustrates the different substantially constant stiffness values that are supplied by the mount of the present invention when the vehicle supports a load in either of the two load ranges illustrated in FIG. 5. For example, the first substantially constant stiffness 100A is supplied by the mount when the supported load is in the first load range which comprises loads from a minimum load to a load just less than the Transition Load. Both the minimum and Transition Loads are generally identified in FIG. 5. The second substantially constant stiffness 100B is supplied by the mount 10A when the supported load is in the second load range which comprises loads from the Transition Load to a maximum load identified in FIG. 5. The Transition Load is located by the dashed font line in FIG. 5.

As shown in FIG. 5, the second stiffness 100B between the Transition and Maximum Loads is greater than the first stiffness 100A that occurs between the minimum load and the Transition Load. Applicants have determined that the stiffness of the second stage between the Transition and maximum Loads may be about five times greater than the stiffness applied in the first stage between the minimum and Transition Loads. When the magnitude of the load supported by the frame is equal in magnitude to the predetermined Transition load, the mount abruptly changes stiffness and maintains such stiffness thereafter, until such time as the load supported by the frame is reduced to a magnitude below the Transition Load. Then the mount stiffness is abruptly reduced to the first substantially constant stiffness 100A. By way of example, the transition load or force may be in the range of 10,000–12,000 pounds for example. Although the curve of FIG. 5 illustrates linear, substantially constant first and second stiffness rates 100A and 100B, in practice the stiffness values 100A and 100B may actually increase slightly with increased deflection. Thus the stiffness values 100A, 100B are categorized herein as being substantially constant. The shims promote the significant increase in mount stiffness when the mount of the present invention experiences loads at or above the predetermined Transition Loads. When the cores or voids are substantially closed by the Transition loading, the axial thickness of the resilient layer is minimized resulting in a small axial separation between adjacent shims. As a result, the mount produces a significant, abrupt increase in mount stiffness at or above the Transition Load value. Prior art mounts with cores or voids provided in the resilient layer do not include stiffening shims in the mount and as a result such prior art mounts do not produce the abrupt, significant changes in stiffness that are produced by the mount of the present invention. Note that the transition displacement identified in FIG. 5 is the sum of the axial displacement of the mount that occurs during increased loading. When the cores are substantially closed, the mount stiffness increases.

In each of the embodiments of the mount of the present invention the axial dimensions of the discrete resilient layers 50a–50g are different. Resilient layer 50a has the greatest axial dimension of the resilient layers 50a–50g and resilient layer 50g has the smallest axial dimension of such resilient layers. Extending axially inwardly toward center 56 from resilient layer 50a to resilient layer 50g the axial thickness of the resilient layers successively decreases between the attachment members 40 and 42. When the mount is subjected to loads equal to or greater than the predetermined Transition Load, each resilient layer is greatly compressed so that adjacent non-resilient members such as attachment members and shims are closely adjacent. Thus the radial dimension of each resilient layer is greatly reduced when the mount is compressed under loading equal to or greater than the Transition Load. Varying the axial thickness dimension of each resilient layer in combination with other features to be described hereinbelow contributes to realizing the abrupt increase in linear stiffness when the Transition Load is applied to the mount. Each resilient layer includes an arcuate void 62a, 62b, 62c, 62d, 62e, 62f and 62g along the outer periphery of each layer and each such void extends completely around the respective layer. The arcuate voids 62a–62f serve as a means for accommodating the outward displacement of the resilient layer when the mount is compressed. Although a plurality of resilient layers are shown and described in first embodiment mount 10A, it should be understood that the mount must generally include at least one resilient layer and although seven resilient layers are illustrated it should further be understood that any suitable number of layers may be provided.

Each resilient layer includes at least one collapsible void and such voids are referenced according to their respective resilient layer 50a, 50b, 50c, 50d, 50e, 50f and 50g as 70a, 70b, 70c, 70d, 70e, 70f and 70g. As shown in FIG. 4, the voids extend laterally between lateral ends or limits 48a and 48b and are open at the lateral limits. Each layer includes three collapsible voids that are substantially similar however, any suitable number of voids may be provided in each of the resilient layers. Additionally, each layer may comprise the same number of voids or a different number of voids.

The voids 70a–70g are aligned axially in three axial groups or axial rows. Although the voids of each discrete resilient layer have substantially the same cross sectional shape, the voids of each resilient layer have different cross sectional areas. The voids vary in shape proportionally. For example, the voids 70a of resilient layer 50a are substantially the same, and relative to the other voids of mount 10A, voids 70a have the maximum void cross sectional area. The other voids have a cross sectional area that is decreased proportionally from resilient members 50b–50g. Although substantially the same relative to the other voids identified as 70g, the voids of resilient layer 50g have a minimum cross sectional area relative to the other voids of mount 10A. Extending axially inwardly toward projected center 56 from layer 50a to layer 50g, the cross sectional areas of voids 70b–70f decrease with each successive radially inwardly located layer. See FIG. 3. Like voids 70a and 70g, for each resilient layer the respective voids 70b–70f are substantially the same.

Figure 7:
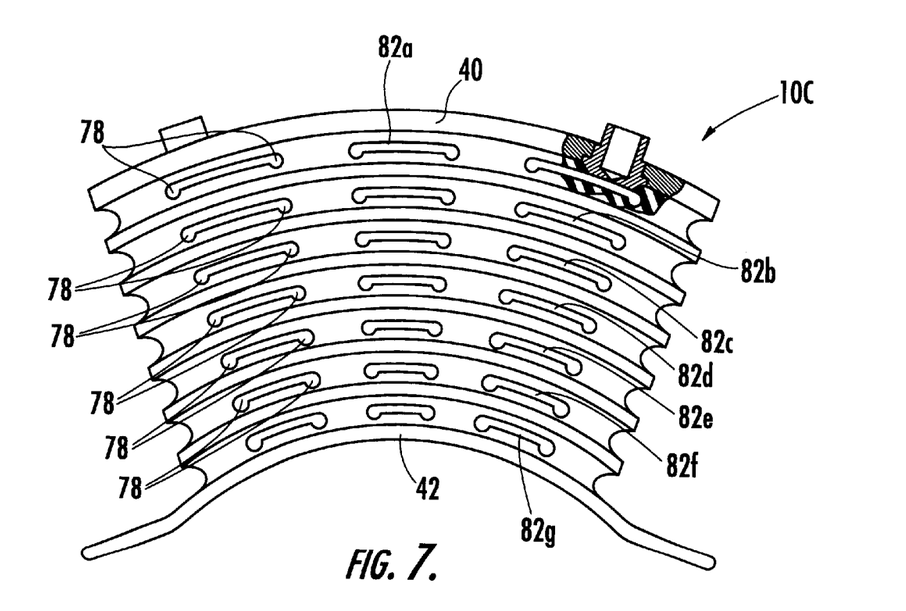
FIG. 7 is an enlarged front view like the view of FIG. 3 that illustrates a third embodiment mount of the present invention.

Although a number of shapes are acceptable for voids 70, it has been determined that the most desirable cross section shape for the collapsible voids are those that have end portions that extend axially a greater distance than the void portion that joins the end portions. Such a void configuration minimizes folding of the resilient layer as it collapses and limits rubber abrasion, crack initiation and stress concentration at the voids. The rubber migrates to the open ends when the voids collapse during compressive loading at or above the Transition Load. For example, as shown in FIG. 3, the collapsible voids 70a–70g comprise a generally dog bone-like shape with end portions 72 that have a greater axial dimensions extending toward members 40 and 42 than the portion 74 joining the ends. The end portions are substantially circular. For all voids 70a–70g, the end portions of the voids 72 extend axially beyond portion 74 in axial directions towards attachment members 40 and 42. It is possible as shown in FIG. 7 that the end portions only extend axially beyond the middle void portion in a single direction. See end portion 78 of third embodiment mount 10C illustrated in FIG. 7. The third embodiment mount will be described in further detail hereinbelow. Returning to FIG. 3, the void ends 72 fill completely with resilient layer when the mount collapses and in this way, shim stresses are greatly reduced and eliminated and the abrupt, substantially constant mount stiffness is produced.

By varying the resilient layer axial thickness and the cross sectional areas of the voids 70 it is possible to obtain the desired abrupt change in stiffness when the transition load is applied to the mount 10A. By providing voids 70 the mount will be relatively soft when the voids are open until the mount is compressed to close the voids. As the voids are closed the mount becomes much stiffer. The Transition Load, where the resilient layers compress and the voids close at the same time is a load the mount experiences somewhere in magnitude between the load experiences when the vehicle is empty and when the vehicle load is at its maximum. As indicated hereinabove, for purposes of describing the preferred embodiment of the invention the transition load may be between 10,000 and 12,000 pounds. When the voids are open the driver will experience a relatively soft ride and when the voids are closed a firm ride will be created.

Figure 6:
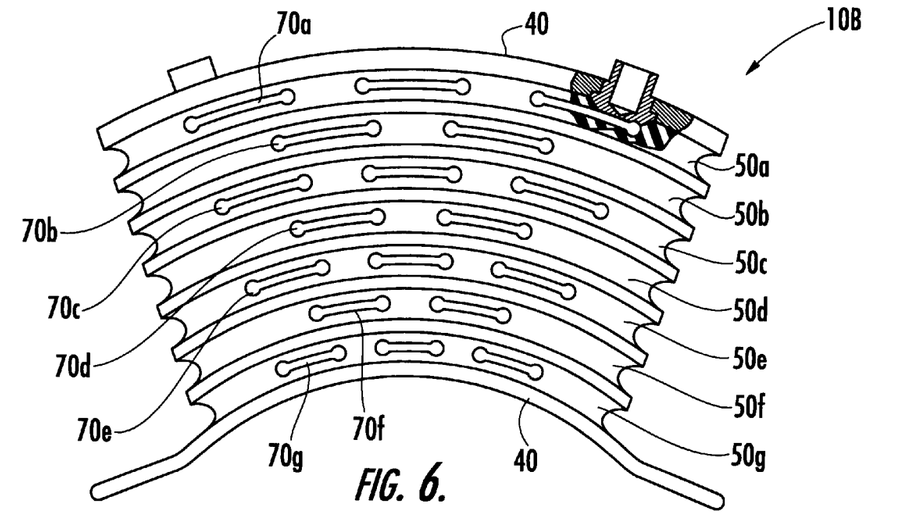
FIG. 6 is an enlarged front view like the view of FIG. 3 that illustrates a second embodiment mount of the present invention.

An alternate embodiment mount 10B is illustrated in FIG. 6. The second embodiment mount 10B is substantially the same as the first embodiment mount 10A, and includes the attachment members 40 and 42, resilient layers 50a–50g and shims 60a–60f as previously described hereinabove. The voids 70a–70f are sized and relatively shaped as described in conjunction with mount 10A. However, the voids of second embodiment mount 10B are arranged in a different manner than the voids of mount 10A. As shown in FIG. 6, the voids of alternating resilient layers 50a, 50c, 50e and 50g are aligned radially in the manner previously described in conjunction with first embodiment mount 10A. Layers 50b, 50d and 50f comprise two voids and the voids of layers 50b, 50d and 50f are aligned radially between each pair of adjacent voids of the adjacent resilient layers. As shown in FIG. 6, the voids of layers 50b, 50d and 50f are aligned axially between the central void and each of the outer voids of the next adjacent resilient layer. Mount 10B provides the same abrupt change in stiffness at the Transition Load as previously described.

A third embodiment mount 10C is illustrated in FIG. 7. The third embodiment mount is substantially the same as mount 10A shown in FIG. 3 except that the void end portions 78 extend axially outwardly from the middle portion 74 in a single radial direction rather than in both axial directions as set forth in voids 70a–70f of first embodiment mount 10A. The end portions of voids 82a–82g are substantially tear drop shaped. Although the ends are illustrated as extending axially outwardly in a single direction toward attachment member 42, it should be understood that the ends might extend axially outwardly from middle portion 74 in a single direction toward first attachment member 40. Additionally, the voids 82 may be arranged in the manner of second embodiment mount 10B shown and described hereinabove. Mount 10C provides the same abrupt change in stiffness at the Transition Load as previously described.

Figure 8:
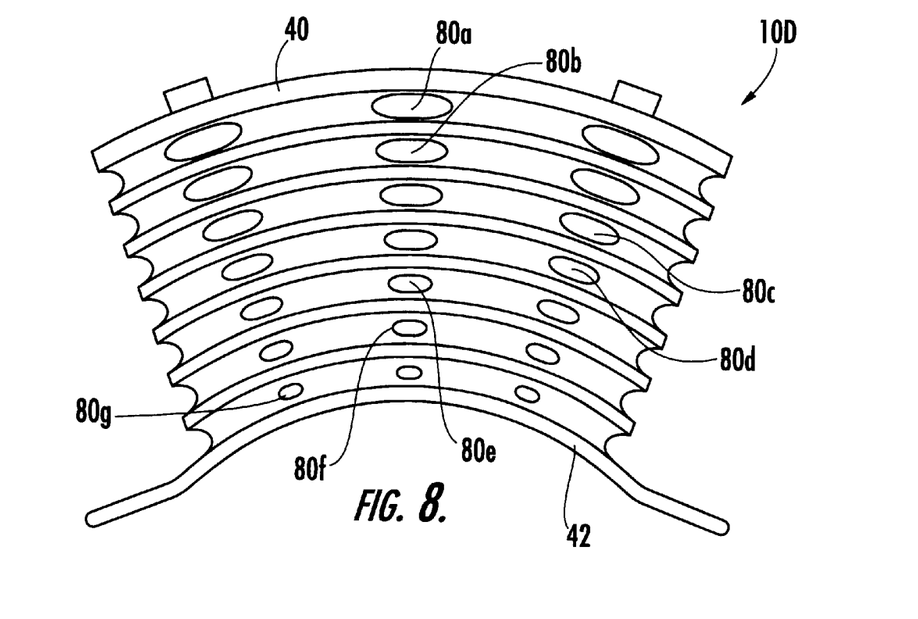
FIG. 8 is an enlarged front view like the view of FIG. 3 that illustrates a fourth embodiment mount of the present invention.

A fourth embodiment mount 10D is illustrated in FIG. 8. The fourth embodiment mount 10D is substantially the same as the first embodiment mount 10A, and includes the attachment members 40 and 42, resilient layers 50a–50g and shims 60a–60f as previously described hereinabove. In the fourth embodiment mount the voids 80a–80g have a substantially elliptical or oval shape. Each resilient layer comprises three voids. The voids are aligned axially as previously described in the discussion of first embodiment mount 10A, however the voids could be arranged in a staggered manner as described in conjunction with mount 10B. Any suitable number of voids may be provided. Mount 10D provides the same abrupt change in stiffness at the Transition Load as previously described.

Figure 9:
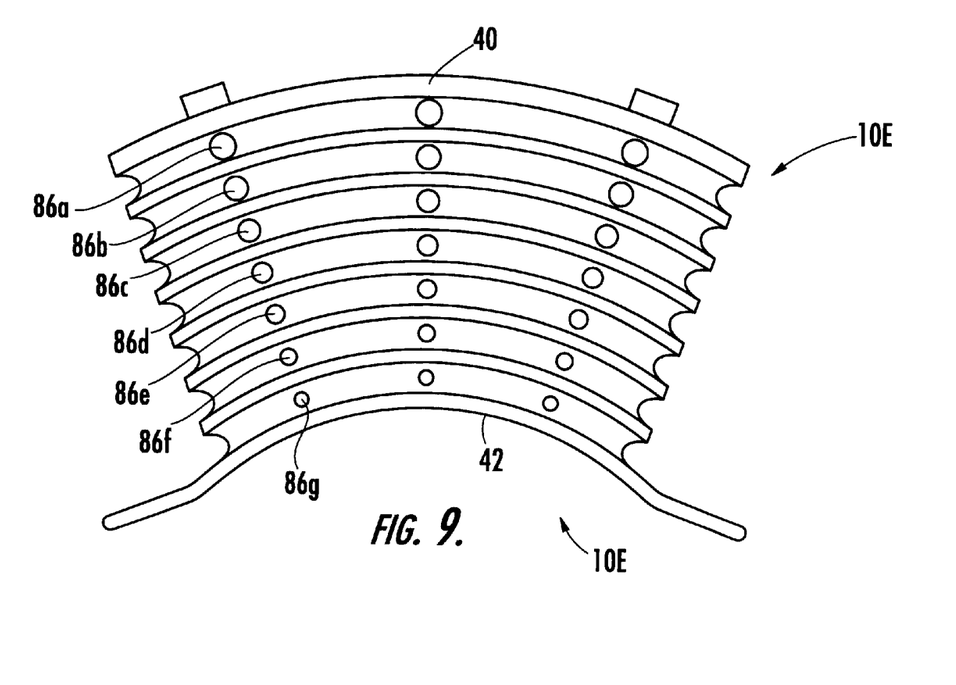
FIG. 9 is an enlarged front view like the view of FIG. 3 that illustrates a fifth embodiment mount of the present invention.

A fifth embodiment mount 10E is illustrated in FIG. 9. The fifth embodiment mount is like the fourth embodiment mount 10D previously described. The fifth embodiment mount includes substantially circular voids 86a–86g in each of the resilient layers. The voids are aligned in includes the attachment members 40 and 42, resilient layers 50a–50g and shims 60a–60f as previously described hereinabove. In the third embodiment mount the voids 80a–80g have a substantially elliptical or oval shape. The voids are aligned axially as previously described in the discussion of first embodiment mount 10A, however the voids could be arranged in a staggered manner as described in conjunction with mount 10B. Mount 10E provides the same abrupt change in stiffness at the Transition Load as previously described.

In summary, in each embodiment mount of the present invention, the axial thickness of each resilient layer and the size shape and placement of the voids are determined to ensure that each resilient layer of the mount and the associated voids collapses simultaneously upon application of a Transition Load to the mount to produce an abrupt change in stiffness, from a first stiffness to a second stiffness. If the load is decreased from above the Transition Load to a load of magnitude below the defined Transition Load value, the closed voids return to their open, orientation and the stiffness is abruptly decreased to a linear stiffness value. If the load is increased from one having a magnitude less than the Transition Load to one of magnitude greater than the Transition Load, the voids are closed and the stiffness is increased to a linear stiffness value. The voids in the resilient layers may have any suitable shape and be arranged in any configuration to produce the desired linear stiffness. Thus the mount of the present invention provides dual, constant stiffness values that are dependent on the load supported by the frame.

While we have illustrated and described a preferred embodiment of our invention, it is understood that this is capable of modification and therefore we do not wish to be limited to the precise details set forth, but desire to avail ourselves of such changes and alterations as fall within the purview of the following claims.

We claim:

1. A mount comprising: a first attachment member; a second attachment member spaced from the first attachment member; and a plurality of discrete resilient members joining the first and second attachment members, each of the discrete resilient members including a plurality of voids, said voids being collapsible under loading between a first open void condition where the mount has a first substantially constant stiffness, and a second collapsed condition where said voids are substantially closed, the mount having a second substantially constant stiffness when said voids are in the second condition, the voids of each discrete resilient member having substantially the same cross sectional area, the cross sectional area of the voids of each discrete resilient member being different than the cross sectional areas of the voids of the other discrete resilient members.

2. The mount as claimed in claim 1 wherein the voids of the resilient member proximate the first attachment member have a maximum cross sectional void area and the voids of the resilient member proximate the second attachment member have a minimum cross sectional area.

3. A mount comprising: a first attachment member; a second attachment member spaced from the first attachment member; and a plurality of adjacent resilient members joining the first and second attachment members, each of said resilient members including at least one void, said void being substantially collapsed when a load having a predetermined threshold magnitude is applied to either the first or second attachment member and said at least one void being uncollapsed when a load having a magnitude less than the threshold magnitude is applied to either the first or second attachment member wherein the mount comprises an axial direction, the axial dimension of each resilient member being different, each pair of adjacent resilient members being separated by a shim member.

4. The mount as claimed in claim 3 wherein the resilient member proximate the first attachment member comprises a maximum axial resilient member dimension and the resilient member proximate the second attachment member comprises a minimum axial resilient member dimension.

5. The mount as claimed in claim 3 wherein each resilient member comprises a plurality of voids, the voids of each resilient member having substantially the same cross sectional area, the cross sectional areas of the voids being dependant on the resilient member comprising such voids.

6. The mount as claimed in claim 5 wherein the mount has at least one resilient member proximate the first attachment member, the voids of the resilient member proximate the first attachment member comprising a maximum void cross sectional area.

7. The mount as claimed in claim 5 wherein the mount has at least one resilient member proximate the second attachment member, the voids of the resilient member proximate the second attachment member comprising a minimum void cross sectional area.

8. The mount as claimed in claim 3 wherein the mount comprises seven resilient members.

* * * * *